United States Patent
Muraki

(10) Patent No.: US 7,020,498 B2
(45) Date of Patent: Mar. 28, 2006

(54) PORTABLE TELEPHONE

(75) Inventor: Yasuyuki Muraki, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 356 days.

(21) Appl. No.: 10/182,001

(22) PCT Filed: Jan. 25, 2001

(86) PCT No.: PCT/JP01/00476

§ 371 (c)(1),
(2), (4) Date: Jul. 24, 2002

(87) PCT Pub. No.: WO01/56014

PCT Pub. Date: Feb. 8, 2001

(65) Prior Publication Data

US 2003/0003968 A1  Jan. 2, 2003

(30) Foreign Application Priority Data

Jan. 26, 2000  (JP) .............................. 2000-017631

(51) Int. Cl.
*H04B 1/38* (2006.01)
(52) U.S. Cl. ...................... 455/567; 455/550.1; 84/612
(58) Field of Classification Search ............ 455/188.4, 455/514, 550.1, 567, 575.1, 575.9; 84/636, 84/622, 659, 612
See application file for complete search history.

(56) References Cited

U.S. PATENT DOCUMENTS

| | | | | |
|---|---|---|---|---|
| 4,535,356 A | * | 8/1985 | Nakagawa et al. | 348/482 |
| 5,300,728 A | * | 4/1994 | Shimada | 84/636 |
| 5,640,682 A | * | 6/1997 | Wagai et al. | 340/7.51 |
| 5,940,501 A | * | 8/1999 | Silvestre et al. | 379/418 |
| 5,942,711 A | * | 8/1999 | Tanji | 84/651 |
| 6,070,053 A | * | 5/2000 | Yamashita | 340/7.58 |
| 6,184,454 B1 | * | 2/2001 | Imai et al. | 84/622 |
| 6,308,086 B1 | * | 10/2001 | Yoshino | 455/567 |
| 6,337,972 B1 | * | 1/2002 | Jones et al. | 340/7.57 |
| 6,366,791 B1 | * | 4/2002 | Lin et al. | 455/567 |
| 6,376,760 B1 | * | 4/2002 | Tozuka et al. | 84/635 |
| 6,418,330 B1 | * | 7/2002 | Lee | 455/567 |
| 6,487,424 B1 | * | 11/2002 | Kraft et al. | 455/566 |
| 6,501,967 B1 | * | 12/2002 | Makela et al. | 455/567 |
| 6,510,438 B1 | * | 1/2003 | Hasegawa | 707/104.1 |

FOREIGN PATENT DOCUMENTS

| | | |
|---|---|---|
| JP | 63159898 | 7/1988 |
| JP | SHO 63-159898 | 7/1988 |
| JP | 2536474 | 7/1996 |
| JP | 09-34455 | 2/1997 |
| JP | 9034455 | 2/1997 |
| JP | 11-215249 | 8/1999 |
| JP | 11215249 | 8/1999 |

\* cited by examiner

*Primary Examiner*—William Trost
*Assistant Examiner*—James D. Ewart
(74) *Attorney, Agent, or Firm*—Pillsbury Winthrop Shaw Pittman LLP

(57) ABSTRACT

A portable telephone downloads from the music download center the music data that contain tone color data, tempo data, and a series of note data and rest data with respect to at least a single musical tune. A CPU outputs to an interface the tone color data, and the series of note data and rest data at a tempo designated by the tempo data. The interface converts these data in the prescribed format (e.g., MIDI format), so that the converted data are output to the external playback device (e.g., synthesizer) via a cable or by radio communication.

9 Claims, 2 Drawing Sheets

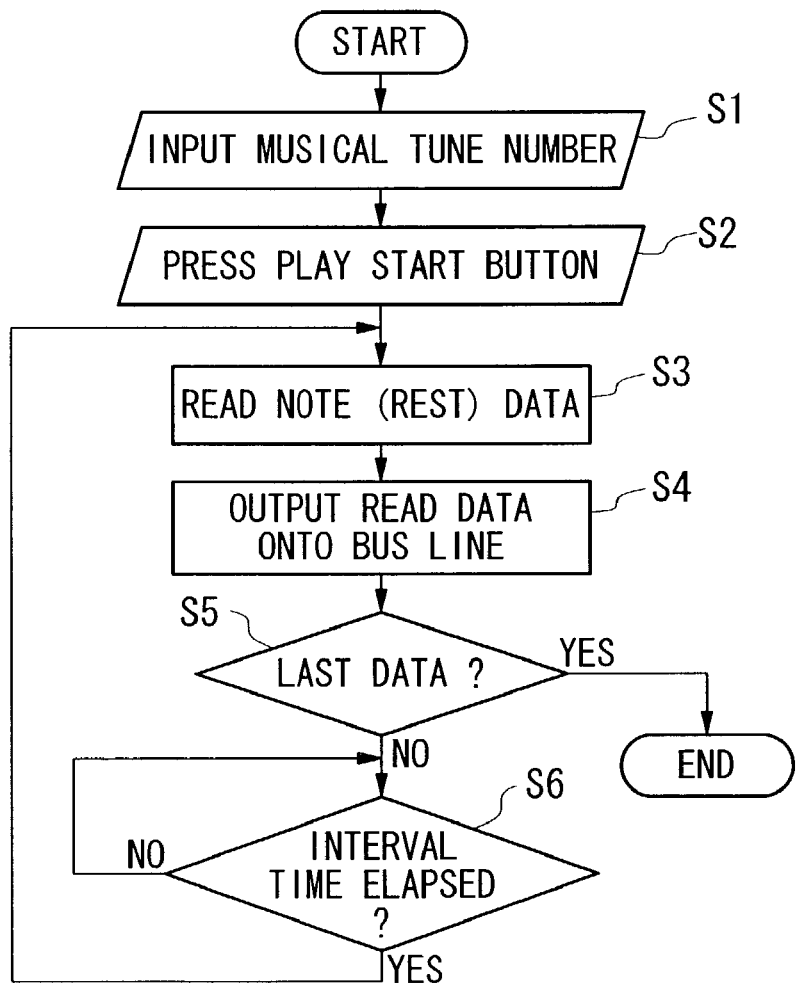

PORTABLE TELEPHONE

This application is the National Phase of International Application PCT/JP01/00476 filed 25 Jan. 2001 which designated the U.S. and that International Application was not published under PCT Article 21(2) in English.

TECHNICAL FIELD

This invention relates to portable telephones that are capable of playing back musical tunes based on music data distributed via telephone lines.

BACKGROUND ART

Recent telecommunication technology allows distribution of music information and data by way of the Internet. In music distribution, users operate terminal devices such as personal computers to download music data of prescribed musical tunes from electronic distribution facilities such as music download centers, so that users are able to play back musical tunes based on the downloaded music data.

Downloading music data from the music download center can be implemented by using portable telephones. Recently, portable telephones are further developed and improved in functions to enable setup for using designated parts of desired musical tunes as incoming call melody sounds, which are rung to notify users of reception of incoming calls from calling parties. Hence, the existing portable telephones are capable of playing back melody lines of simple musical tunes.

However, the conventional portable telephones are limited in melody playback functions so that limited numbers of tone colors can be used for playback. That is, the conventional portable telephones have problems in playback of 'polyphonic' musical tunes because they are incapable of accurately playing back the musical performance of orchestras with fidelity to original tone colors.

It is an object of the present invention to provide a portable telephone that is capable of accurately playing back polyphonic musical tunes with fidelity to original tone colors.

DISCLOSURE OF INVENTION

A portable telephone of this invention is designed to enable playback of polyphonic musical tunes downloaded from the music download center with fidelity to original tone colors.

That is, the portable telephone downloads from the music download center the music data that contain tone color data, tempo data and a series of note data and rest data with respect to at least a single musical tune. The music data are temporarily stored in a memory, or they are directly forwarded to a CPU. The CPU outputs the tone color data designating tone colors for use in the playback of a musical tune to an interface. The CPU also outputs to the interface a series of note data and rest data at a tempo designated by the tempo data. The interface converts the tone color data, note data and rest data in the prescribed format (e.g., MIDI format) to suit the external playback device. The converted data are output to the external playback device via an output terminal; alternatively, they are transmitted to the external playback device by radio communication.

For example, the external playback device is a synthesizer that has sequencer functions for the playback of a musical tune based on the output data of the portable telephone.

BRIEF DESCRIPTION OF DRAWINGS

FIG. 2 shows an example of the configuration of music data corresponding to a single musical tune.

FIG. 3 is a flowchart showing a playback process of music data.

BEST MODE FOR CARRYING OUT THE INVENTION

Figure 1:
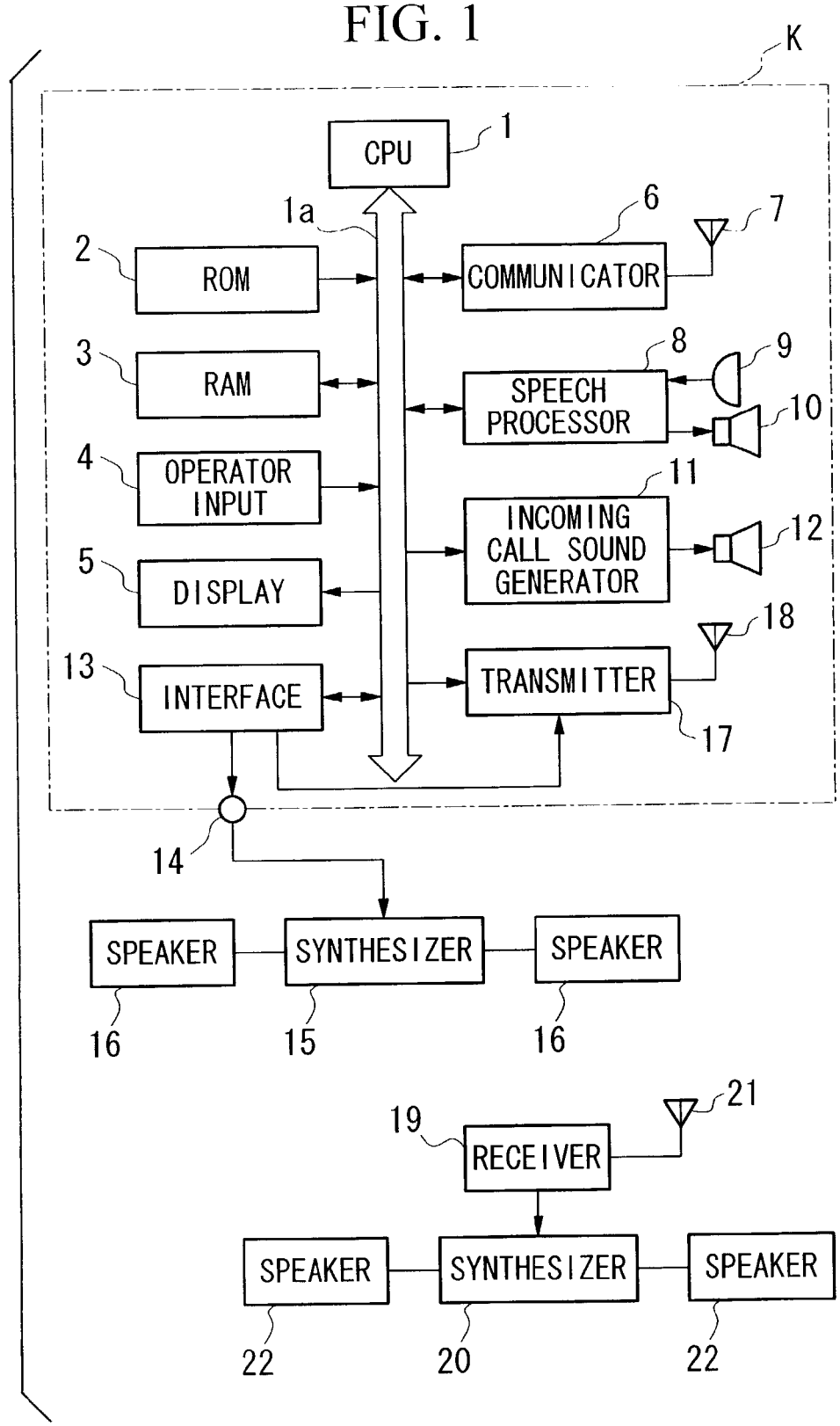
FIG. 1 is a block diagram showing electronic configurations of a portable telephone coupled with an external playback device in accordance with the preferred embodiment of the present invention.

This invention will be described in further detail by way of examples with reference to the accompanying drawings.

FIG. 1 shows electronic configurations of a portable telephone K coupled with an external playback device in accordance with the preferred embodiment of the present invention. Herein, reference numeral 1 designates a central processing unit (CPU) that pivotally controls the internal circuits and sections of the portable telephone K, wherein the CPU 1 performs transfer of data and instructions between the internal circuits and sections of the portable telephone K. The CPU 1 also acts as a sequencer that controls the external playback device, namely, a synthesizer or a personal computer, for example. Reference numeral 2 designates a read-only memory (ROM) that stores programs executed by the CPU 1 and incoming call melody data used for generation of incoming call melody sounds.

Reference numeral 3 designates a random-access memory (RAM) that is used as a temporary storage of data. That is, the RAM 3 temporarily stores telephone numbers used for dialing and music data used for playback of musical tunes. The portable telephone K is connected with a telephone line to download from the music download center the music data, which are stored in the RAM 3. Incidentally, the RAM 3 has battery-backup. Reference numeral 4 designates an operator input section containing numeric keys for entry of telephone numbers and function keys for inputting commands and instructions. Reference numeral 5 designates a display that is constituted by a liquid crystal display and a display control circuit.

Reference numeral 6 designates a communicator connected with an antenna 7. That is, the communicator 6 transmits signals and data on carrier waves by way of the antenna 7. In addition, the communicator 6 receives data via the antenna 7, so that received data are demodulated and are forwarded to the CPU 1 or a speech processor 8. A microphone 9 picks up and converts the user's speech of the portable telephone K to speech signals, which are forwarded to the speech processor 8. The speech processor 8 converts the speech signals to digital data, which are compressed and forwarded to the communicator 6. In addition, the speech processor 8 converts received data (i.e., speech data) of the communicator 6 to analog speech signals, which are forwarded to a speaker 10.

Reference numeral 11 designates an incoming call sound generator that converts the incoming call melody data stored in the ROM 2 to analog signals, which are forwarded to a speaker 12. Thus, the speaker 12 produces incoming call melody sound to notify the user of the portable telephone K of reception of an incoming call.

Reference numeral 13 designates an interface that is used to output music data to the external device. That is, the music data output from the interface 13 are supplied to the external device, which is provided externally of the portable telephone K, via an output terminal 14. In FIG. 1, the portable telephone K is connected with a synthesizer 15 as an example of the external device (or external playback device). The synthesizer 15 is coupled with speakers 16. Incidentally, it is possible to connect the portable telephone K with other types of external devices such as personal computers.

Reference numeral 17 designates a transmitter that is used to transmit music data to the prescribed external device by radio communication. That is, the transmitter 17 transmits the music data on carrier waves by an antenna 18. As an example of the external device (or external playback device), it is possible to use a synthesizer 20 that is coupled with a receiver 19, which receives the music data transmitted thereto by radio communication. Incidentally, the receiver 19 is connected with an antenna 21 for receiving radio waves, and the synthesizer 20 is coupled with speakers 22.

Next, descriptions will be given with respect to operations of the portable telephone K, which has sequencer functions for playing back musical tunes in addition to portable telephone functions for normal phone communications. First, a description will be given with respect to portable telephone functions of the portable telephone K.

In a call reception mode for reception of an incoming call from a calling party, the communicator 6 receives incoming call signals by the antenna 7, wherein the incoming call signals are demodulated to produce incoming call data, which are forwarded to the CPU 1. Upon receipt of the incoming call data, the CPU 1 accesses the RAM 3 to store the telephone number of the calling party. Then, the CPU 1 accesses the ROM 2 to read incoming call melody data, which are forwarded to the incoming call sound generator 11. The incoming call sound generator 11 converts the incoming call data to analog signals, which are forwarded to the speaker 12. Thus, the speaker 12 produces incoming call melody sound to notify the user of the reception of an incoming call from the calling party.

Hearing the incoming call melody sound rung by the portable telephone K, the user presses a call reception button (not shown) on the operator input section 4, so that the CPU 1 issues an incoming call sound stop instruction to the incoming call sound generator 11. In addition, the CPU 1 also issues a line connection instruction to the speech processor 8 and communicator 6. Thus, the portable telephone K is connected with the telephone terminal of the calling party via telephone lines, so that it is possible to proceed to conversation process between the portable telephone K and the telephone terminal. That is, the microphone 9 converts the user's speech to speech signals, which are transmitted to the telephone terminal. In addition, the speech data of the telephone terminal are transmitted to the portable telephone K, so that corresponding speech signals are output from the speech processor 8 to the speaker 10, which produces the speech picked up by the telephone terminal.

In a call transmission mode, the user operates numeric keys on the operation input section 4 to enter a telephone number of a prescribed called party; then, the user presses a call transmission button (not shown). Upon entry of the telephone number, the CPU 1 writes the telephone number to the RAM 3. When the user presses the call transmission button, the CPU 1 transfers the telephone number from the RAM 3 to the communicator 6. The communicator 6 transmits data of the telephone number on carrier waves by the antenna 7. Hence, a call connection is established with the telephone terminal of the called party on the basis of the telephone number transmitted from the communicator 6.

Then, the CPU 1 issues a line connection instruction to the communicator 6 and speech processor 8. Thus, it is possible to proceed to conversation process between the telephone terminal and the portable telephone K, which the user performs conversation by using the microphone 9 and speaker 10.

The aforementioned operations and processes are similar to those of the conventional portable telephones.

When the sequencer 15 acts as a simple sound source device that does not have sequencer functions, the portable telephone K realizes sequencer functions for playback of musical tunes in addition to portable telephone functions. Next, a description will be given with respect to operations of the portable telephone K that acts as a sequencer for playback of musical tunes. For convenience' sake, the description will be given with respect to operations of the portable telephone K that is connected with the synthesizer 15 via a cable (not shown) and that proceeds to playback of musical tunes based on music data which are downloaded from the music download center and are stored in the RAM 3.

Now, the user calls the music download center by the portable telephone K to request distribution and download of music data. The music download center is computer facilities exclusively used for distribution of music information and data. Upon receipt of requests from users via telephone lines, the music download center distributes and downloads music data of requested musical tunes to users.

FIG. 2 shows an example of the configuration of music data corresponding to a single musical tune distributed from the music download center. The music data of a single musical tune contains a header representing a top position of the music data, tone color data for designation of tone colors used for playback of notes, tempo data for designation of a tempo in playback of the musical tune, and a string of note data and rest data that forms an entire score of the musical tune.

The music data distributed by the music download center are received by the antenna 7 and communicator 6 of the portable telephone K, so that the received music data are forwarded to the CPU 1. The CPU 1 writes the music data to the RAM 3 to complete download procedures of the music data distributed from the music download center. Incidentally, downloading the music data is not necessarily limited to a single musical tune. Hence, it is possible to download music data of multiple musical tunes collectively.

Next, the user operates a prescribed key on the operation input section 4 to instruct the CPU 1 to start playback of the 'downloaded' music data. In response to such an operation of the prescribed key, the CPU 1 reads the music data from the RAM 3. Within the music data, tone color data are firstly forwarded to the interface 13; then, a series of note data and rest data are sequentially forwarded to the interface 13 at a tempo designated by the tempo data.

The aforementioned tone color data, note data and rest data are supplied to the synthesizer 15 via the output terminal 14. The synthesizer 15 provides various types of internal sound sources corresponding to prescribed tone colors respectively. Among them, the synthesizer 15 selects a sound source (or sound sources) in response to the tone color data, so that playback of the note data is performed using the selected sound source(s). In addition, the tempo data designates a tempo for playback of the note data and rest data. That is, the playback tempo of the note data and rest data is controlled by the CPU 1 built in the portable telephone K. Outputs of the synthesizer 15 are supplied to the speakers 16, which in turn produce corresponding musical tones of the downloaded musical tune. Thus, the user is able to play back desired musical tunes by using the portable telephone K.

When the synthesizer 15 is designed as a sound source device having sequencer functions, the interface 13 converts the tone color data, note data and rest data in the prescribed format to suit the synthesizer 15. As the prescribed format that suits the synthesizer 15, it is possible to use the MIDI format (where 'MIDI' is an abbreviation for 'Musical Instruments Digital Interface') and other specified formats that are exclusively used for the synthesizer 15. That is, the interface 13 provides conversion realizing the prescribed format of sequence data that are used for the playback of musical tunes by using the internal sound sources of the synthesizer 15. Thus, the interface 13 converts and outputs the tone color data, note data and rest data to the external device, which is provided externally of the portable telephone K, via the output terminal 14. Sequencer functions in which a prescribed sound source (or sound sources) is selected from among various types of internal sound sources in response to the tone color data and is used for the playback of note data are installed in the synthesizer 15 or 20. Outputs of the synthesizer 15 are supplied to the speakers 16, which in turn produce musical tones of the prescribed musical tune. As described above, the user is able to play music by using the portable telephone K.

In the present embodiment, the downloaded music data are temporarily stored in the RAM 3 and are then subjected to playback. It is possible to modify the present embodiment such that the musical tune is being played back while being downloaded from the music download center in a real time manner. In this case, the communicator 6 of the portable telephone K receives music data downloaded from the music download center, so that the downloaded music data are sequentially supplied to the CPU 1. Herein, the downloaded music data are not stored in the RAM 3, so that the CPU 1 immediately sends tone color data, note data and rest data contained in the music data to the synthesizer 15 by means of the interface 13.

In the present embodiment, the portable telephone K is connected with the synthesizer 15 by way of a cable. Of course, it is possible to transmit music data to the synthesizer 20 by radio communication. In this case, the portable telephone K transmits music data by means of the transmitter 17 and antenna 18. The transmitted music data are received by the receiver 19 of the external playback device via the antenna 21, so that they are forwarded to the synthesizer 20.

Next, a playback process of downloaded music data will be described in detail with reference to a flowchart shown in FIG. 3, wherein steps are designated by reference symbols S1 to S6 respectively.

The following description is based on the precondition that the portable telephone K downloads from the music download center multiple musical tunes which are designated by musical tune numbers respectively. In step S1, the user operates keys on the operator input section 4 of the portable telephone K to input a prescribed musical tune number for selecting a prescribed musical tune from among multiple musical tunes. In step S2, the user presses a play start button on the operator input section 4, so that the portable telephone K starts the playback of the prescribed musical tune designated by the prescribed musical tune number.

In the playback of the musical tune, the CPU 1 firstly reads the tempo data of the music data stored in the RAM 3. This determines setup of the portable telephone K such that the CPU 1 sequentially sends note data and/or rest data onto a bus line 1a at a tempo designated by the tempo data.

Next, the CPU 1 reads tone color data from the music data, so that the read tone color data are forwarded to the interface 13 via the bus line 1a. The interface 13 converts the tone color data in the prescribed format to suit the synthesizer 15, so that the converted tone color data are supplied to the synthesizer 15 via the output terminal 14. In response to the tone color data, the synthesizer 15 determines a sound source (or sound sources) that is used for the playback of note data within the internal sound sources.

In step S3, the CPU 1 sequentially reads from the RAM 3 a series of note data and rest data from top positions within the music data. These data are forwarded to the interface 13 via the bus line 1a in step S4. The interface 13 converts the note data and rest data in the prescribed format to suit the synthesizer 15, so that the converted note data and rest data are sequentially supplied to the synthesizer 15 via the output terminal 14. Thus, the synthesizer 15 plays back the musical tune based on the music data. In this case, the synthesizer 15 uses the sound source(s), designated by the tone color data, to play back the musical tune.

After sending the note data and rest data onto the bus line 1a, the CPU 1 makes a decision as to whether or not it sends the last data within the series of the note data and rest data in step S5. If the CPU 1 sent the last data onto the bus line 1a, the CPU 1 ends the playback process of the music data. If not, the flow proceeds to step S6 in which the CPU 1 waits for a lapse of an interval time, which is directly determined by the tempo data as an interval of time between notes or between rest symbols. After the interval time elapsed completely, the flow proceeds to step S3 in which the CPU 1 reads next note data or next rest data from the music data stored in the RAM 3.

It is possible to modify the present embodiment such that bidirectional data transfer is implemented between the portable telephone K and external playback device. The bidirectional data transfer can be realized by partially modifying functions of constituent elements of the present embodiment shown in FIG. 1. That is, in the portable telephone K, the interface 13 is modified to additionally provide data input functions, and the transmitter 17 is modified to additionally provide reception functions so that the transmitter 17 acts as a transceiver. In the external playback device, the synthesizer 15 is modified to additionally provide data output functions, and the receiver 19 is modified to act as a transceiver. Due to the aforementioned modifications, the portable telephone K is capable of receiving data from the external playback device. Thus, the user is able to stop the playback of the musical tune by operating the stop switch of the external playback device, while the portable telephone K can automatically interrupt data transfer when the memory is fully loaded with data.

Lastly, this invention is not necessarily limited to the foregoing embodiment, hence, it is possible to provide any types of modifications within the scope of the invention without departing from essential subject matters.

What is claimed is:

1. A portable telephone comprising:
    a receiver for receiving music data corresponding to a single musical tune, wherein the music data contain a series of note data and rest data that form an entire score of the single musical tune, tone color data designating tone colors used for playback of the note data, and tempo data designating a tempo for playback of the note and the rest data;

a controller for outputting the tone color data contained in the music data received by the receiver and for outputting the note data and the rest data at the tempo designated by the tempo data; and a sender for sending the tone color data, the note data and the rest data output from the controller to an external playback device.

2. A portable telephone according to claim 1, further including a storage for temporarily storing the music data received by the receiver, so that the controller reads the music data from the storage so as to output the tone color data and to output the note data and the rest data at the tempo designated by the tempo data.

3. A portable telephone according to claim 1, wherein the sender includes an interface for converting the tone color data, the note data and the rest data output from the controller in a prescribed format to suit the external playback device, and an output terminal for outputting to the external playback device the tone color data, the note data, and the rest data that are converted to the prescribed format by the interface.

4. A portable telephone according to claim 1, wherein the sender includes an interface for converting the tone color data, the note data, and the rest data output from the controller in a prescribed format to suit the external playback device, and a transmitter for transmitting by radio communication the tone color data, the note data, and the rest data that are converted to the prescribed format in the interface.

5. A portable telephone comprising:

a communicator for downloading music data from a music download center, wherein the music data contain tone color data, tempo data, and a series of note data and rest data with respect to at least a single musical tune;

a controller for receiving the music data to output the tone color data designating tone colors for playback of the musical tune and to output the series of the note data and the rest data at a tempo designated by the tempo data;

an interface for converting the tone color data, the note data and the rest data in a prescribed format to suit an external playback device;

an output terminal for outputting the tone color data, the note data and the rest data that are converted to the prescribed format to the external playback device; and a transmitter for transmitting by radio communication the tone color data, the note data and the rest data that are converted to the prescribed format to the external playback device.

6. A portable telephone according to claim 5 further including a storage for temporarily storing the music data from the communicator, so that the controller reads the music data from the storage.

7. A portable telephone according to claim 5, wherein the external playback device is a synthesizer that has sequencer functions for playback of the musical tune based on the tone color data, the note data and the rest data that are converted to the prescribed format and are supplied thereto via the output terminal or via radio communication.

8. A portable telephone comprising:

a receiver for receiving music data corresponding to a single musical tune, wherein the music data contains a series of note data and rest data that form an entire score of the single musical tune, tone color data designating tone colors used for playback of note data, and tempo data designating a tempo for playback of the note data and the rest data;

a controller for outputting the tone color data contained in the music data received by the receiver and for outputting the note data and the rest data at the tempo designated by the tempo data; and a sender for sending the tone color data, the note data and the rest data output from the controller to an external playback device via an interface exclusively used therefore.

9. A portable telephone comprising:

a receiver for receiving music data corresponding to a single musical tune, wherein the music data contains a series of note data and rest data that form an entire score of the single musical tune, tone color data designating tone colors used for the playback of the note data, and tempo data designating a tempo for playback of the note data and the rest data;

a controller for outputting the tone color data contained in the music data received by the receiver and for outputting the note data and the rest data at the tempo designated by the tempo data; and a sender for sending the tone color data, the note data, and the rest data output from the controller to an external playback device via a transmitter that is arranged independently of a communicator for use in telephone communication.

* * * * *